G. RENSCH.
COUPLING DEVICE FOR FLEXIBLE SHAFTS.
APPLICATION FILED MAY 31, 1912.
1,173,682.
Patented Feb. 29, 1916.
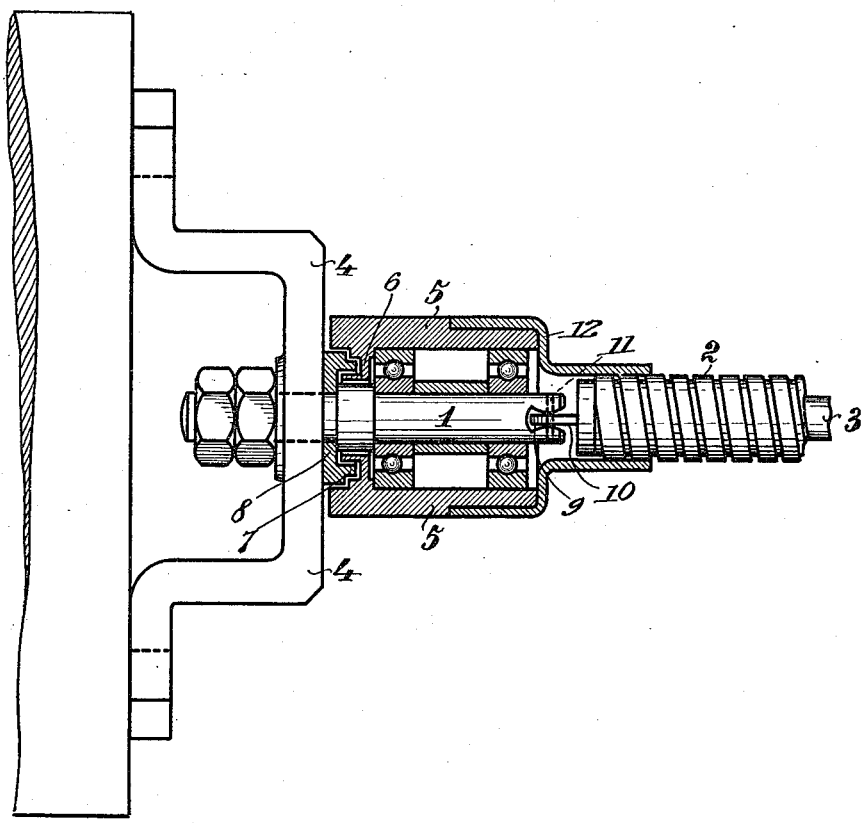

UNITED STATES PATENT OFFICE.

GEORG RENSCH, OF BERLIN, GERMANY.

COUPLING DEVICE FOR FLEXIBLE SHAFTS.

1,173,682.  Specification of Letters Patent.  Patented Feb. 29, 1916.

Application filed May 31, 1912. Serial No. 700,905.

*To all whom it may concern:*

Be it known that I, GEORG RENSCH, a subject of the King of Prussia, residing at Berlin, in the Kingdom of Prussia and German Empire, have invented new and useful Improvements in Coupling Devices for Flexible Shafts, of which the following is a specification.

My present invention relates to means for operatively connecting a flexible shaft for operating a tachometer with a rotating axis of a locomotive or other moving vehicle.

The novel feature of the invention consists in directly coupling a flexible shaft with an axis of the vehicle, so that said shaft is rotated without the assistance of any intermediate spur-wheel gearing. Further, a protective casing is provided which incloses the flexible shaft over its entire length, the end of said casing, which is or may be formed as a dust-proof covering for the coupling, being arranged immediately on the driving axis.

By this invention not only is the driving gear and the entire device simplified, but a steady accurate operation of the tachometer is assured. The tachometers having mechanical driving gears, as heretofore used in my experience, are provided with intermediate spur-wheel gears, which are mounted in a special casing attached to the frame of the locomotive. As is well known this arrangement is very defective owing to the varying distance between the frame and axes of the vehicle due to the swaying of the engine and the play of the bearings and journal-boxes.

Attempts have therefore been made to arrange the intermediate gearing and its casing directly on the driving axis or on an extension of the same, in order thus to overcome the defects due to the varying distance between the frame and axes. Apart from the fact that spur-wheel gearing for driving a tachometer is necessarily defective, for the reasons enumerated, experiments have shown that even a slight wearing of the spur-wheels and bearings of the gearing produces an uncertain and inaccurate movement of the indicator hand of the tachometer.

The present invention removes these difficulties by coupling the flexible shaft directly to the rotating axis or to an extension of the same, that is to say, without any intermediate spur-wheels and by inclosing said flexible shafts throughout its entire length in a protective casing which is journaled on the driving axis. Said casing overcomes all swaying movement of the flexible shaft, the coupling however being so designed that the coupled parts have perfect freedom of movement. The end of the protective casing is preferably constructed as a dust-proof box surrounding the coupling.

The invention is illustrated by way of example on the accompanying drawing, in which the figure is an elevation, partly in section.

1 is a pin arranged in a line with the axis of the crank-pin or other shaft of the locomotive and adapted to drive the flexible shaft 3 inclosed in the protective casing 2. The pin 1 is rigidly connected by means of suitable nuts or other locking devices with a yoke or bridge 4 which is rigidly connected in any suitable manner, as by bolts, to the axle whose speed is to be measured, said yoke diametrically spanning the end of said axle. Of course, instead of this bow or bridge piece 4 a so-called counter crank may be employed, if the flexible shaft is to be connected to a crank axis. The end of the protective casing 2 is joined to or carries a box or housing 5, said box 5 being further supported by ball bearings on the driving pin 1. A sleeve 12 is employed to suitably connect said housing 5 and the casing 2. Said casing or housing 5 completely surrounds said pin 1 and is provided on its inner end with an inwardly projecting flange 6 which forms an annular recess or groove into which the overhanging lip 7 of a collar 8 projects, said collar 8 being mounted on the pin 1 in suitable manner and forming a dust-proof closure. Thus the flexible shaft 3 and its connection with the rigidly mounted extension of the rotating element are completely protected from dust and dirt.

The free end of the projection or pin 1 is milled out to form a recess 9 into which the flat connecting link 10 projects and is secured, as by a pin 11. The opposing faces of the recess 9 are rounded in convex form, so that the recess is wider at its forward and rear ends than at its middle point where the link 10 is pivotally connected, so that the free motion between the pin 1 and the link 10 is that of a universal joint.

What I claim and desire to secure by Letters Patent of the United States is:—

1. A direct connection for coupling tachometers to locomotive axles, comprising in combination with an axle-end, a bridge-piece carried by the axle-end, a rotary extension rigidly mounted on said bridge-piece in axial alinement with the axle-end, a flexible shaft directly connected to said extension, a dust-proof covering for said shaft, and an enlarged housing fixed to said shaft covering and having a rotative connection with said extension of the axle to permit rotation of said bridge-piece and the extension relative thereto, said housing substantially completely covering said extension to exclude dust from the connection.

2. A direct connection for coupling tachometers to locomotive axles, comprising in combination with an axle-end, a bridge-piece rotative with the axle-end, an extension projecting rigidly from said bridge-piece in axial alinement with said axle-end, a flexible shaft directly connected to said extension, a fixed housing covering said extension and having a journaled connection therewith to permit rotation of said bridge-piece and the extension relative thereto, a dust-proof covering for said shaft connected to one end of said housing, and a dust-proof closure associated with the opposite end of said housing, and carried by said bridge-piece.

In testimony whereof I have signed my name to this specification in the presence of two subscribing witnesses.

GEORG RENSCH.

Witnesses:
 WOLDEMAR HAUPT,
 HENRY HASPER.

Copies of this patent may be obtained for five cents each, by addressing the "Commissioner of Patents, Washington, D. C."